United States Patent [19]
Maurer et al.

[11] 3,872,957
[45] Mar. 25, 1975

[54] FLUID-SUPPLY SYSTEM FOR HYDRAULIC COUPLING

[75] Inventors: Gerhard Maurer; Fritz Geiger, both of Friedrichshafen, Germany

[73] Assignee: Zahnradfabrik Friedrichshafen Aktiengesellschaft, Friedrichshafen, Germany

[22] Filed: Nov. 28, 1973

[21] Appl. No.: 419,720

[52] U.S. Cl. .................. 192/113 B, 60/456, 91/46, 92/153
[51] Int. Cl. ...................... F16d 13/72, F16d 13/74
[58] Field of Search ........ 60/456; 192/113 B; 91/46; 92/153

[56] References Cited
UNITED STATES PATENTS

| | | | |
|---|---|---|---|
| 2,232,428 | 2/1941 | Benedek | 60/456 |
| 3,618,719 | 1/1970 | Marland | 192/113 B |
| 3,659,668 | 5/1972 | Ross et al. | 192/113 B |

Primary Examiner—Edgar W. Geoghegan
Assistant Examiner—Wm. F. Woods
Attorney, Agent, or Firm—Karl F. Ross; Herbert Dubno

[57] ABSTRACT

A hydraulically actuated coupling (i.e. a clutch or a brake), designed to control the transmission of torque from an engine to a load, receives operating fluid from an engine-driven oil pump via a supply line in which, with engine speeds above a certain limit, a substantially constant oil pressure is maintained by a spring-biased pressure-relief valve provided with an overflow line carrying a flow of excess oil under variable pressure. The overflow line, from which an extension leads to engine bearings and other units to be lubricated and/or cooled, and a branch of the supply line extend through constrictions to a conduit for the circulation of a mixture of constant-pressure and variable-pressure oil as a lubricating and/or cooling liquid through the hydraulic coupling.

4 Claims, 1 Drawing Figure

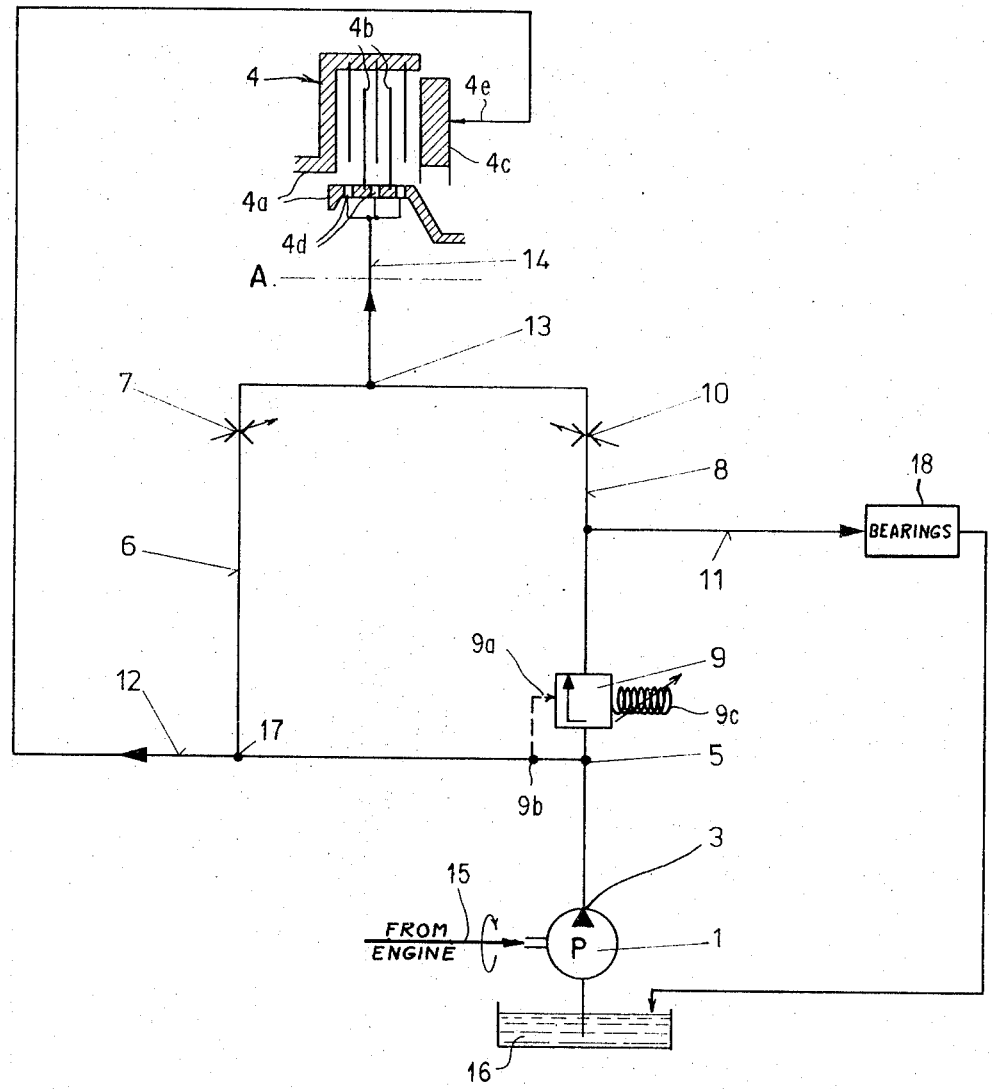

FLUID-SUPPLY SYSTEM FOR HYDRAULIC COUPLING

FIELD OF THE INVENTION

Our present invention relates to a fluid-supply system for a hydraulically actuated coupling (hereinafter referred to simply as a hydraulic coupling), operating as a clutch or a brake, which serves to control the transmission of torque from an engine to a load such as the traction wheels of an automotive vehicle.

BACKGROUND OF THE INVENTION

In our copending application Ser. No. 347,341, filed 2 April 1973, now U.S. Pat. No. 3,834,503, we have disclosed a dual hydraulic coupling or clutch designed to establish alternate operative connections between a central structure and a pair of associated transmission elements whereby an engine-driven input shaft can be coupled to an output shaft through either of two pinions forming part of a reversing gear. The central structure is a partition flanked by two axially movable pistons which co-operate with respective sets of clutch plates; upon the admission of pressure fluid such as oil to either piston for the engagement of its clutch plates, an associated pair of spring-loaded plungers unblock two normally blocked ports in the partition for the circulation of lubricant (usually the same kind of oil) to the respective clutch assembly.

The lubricating oil, which also serves as a coolant for the clutch plates, is delivered by an engine-driven pump so that its pressure is substantially proportional to engine speed. This has the advantage that the cooling effect is greater at higher speeds when the switching operations of the coupling require more energy and therefore generate more heat. No ancillary oil flow takes place in the disengaged stage of the clutch.

In some instances it is difficult with such a speed-dependent fluid supply to meet the requirements for satisfactory lubrication and/or cooling at low engine speeds without wastefully increasing the fluid flow at high speeds beyond the required rate. These considerations, though relevant in connection with any hydraulic clutch or brake of the general type referred to, apply particularly to dual clutches of the kind discussed above as used in heavy-duty reversing gears, e.g. for marine engines.

OBJECTS OF THE INVENTION

The principal object of our present invention, therefore, is to provide an improved system for the supply of hydraulic liquid (referred to hereinafter, for convenience, as oil) as a working fluid and as an ancillary fluid (i.e. a lubricant and/or coolant) to a hydraulic coupling in a manner satisfying the requirements of that coupling under all operating conditions.

A more particular object is to provide means in such a system for delivering any excess hydraulic liquid, not needed by the coupling, to another destination such as engine, wheel or transmission bearings to be lubricated.

SUMMARY OF THE INVENTION

These objects are realized, in conformity with our present invention, by the provision of a supply line extending from an engine-driven pump to a first or working inlet of the hydraulic coupling served thereby, this supply line being connected to pressure-regulating means for maintaining therein a fluid pressure substantially independent of engine speed whenever that speed exceeds a predetermined limit. An overflow line of the pressure-regulating means carries fluid of variable pressure whereas a branch of the supply line carries fluid of substantially constant pressure; the overflow and branch lines merge in a common conduit terminating at a second or ancillary inlet of the hydraulic coupling. In this way, the pressure of lubricating and/or cooling oil arriving at the ancillary inlet has an invariable component as well as a variable component whose relative magnitudes can be adjusted to meet the requirements of the coupling.

According to a more particular feature of our invention, the two merging lines are provided with respective constrictions upstream of the common conduit in order to maintain the requisite fluid pressure at the working inlet, the overflow line being tapped ahead of its constriction for the delivery of excess oil to an extension conduit leading to one or more supplemental loads whence the oil is returned to the sump or intake side of the pump.

In a preferred embodiment, the pressure-regulating means comprises a spring-loaded pressure-relief valve having a control inlet connected to the supply line. Adjustment of the spring pressure acting upon that valve enables the desired proportioning of the constant-pressure and variable-pressure components of the oil flow in the common conduit. Alternatively, or in addition, this proportion can be varied by altering the constriction of either or each of the two merging lines.

BRIEF DESCRIPTION OF THE DRAWING

The invention will now be described in greater detail with reference to the accompanying drawing the sole FIGURE of which diagrammatically illustrates an embodiment of our improved fluid-supply system.

SPECIFIC DESCRIPTION

In the drawing we have shown at 4 a hydraulic coupling which may be a dual clutch of the type disclosed in our aboveidentified copending application and patent. The clutch 4 (of which only the upper-left portion has been illustrated) has a generally cylindrical housing 4a centered on an axis A, a set of annular plates 4b in that housing and an annular piston 4c coacting with these plates; this piston may be positively linked with another piston of a symmetrical assembly on the other side of a nonillustrated transverse partition as described and shown in our U.S. Pat. No. 3,834,503. Housing 4a is formed with a series of orifices 4d giving access to the space of the clutch plates, these orifices forming an inlet for lubricating and cooling oil. Working fluid can be admitted via another inlet 4e to the right-hand side of piston 4c.

A pump 1, driven from a nonillustrated engine via a shaft 15, circulates oil from a reservoir or sump 16 through a discharge port 3 and a supply line 12 to the working inlet 4e of clutch 4, this supply line being connected at a junction 5 to a pressure-relief valve 9 provided with an overflow line and at a junction 17 to a branch line 6. The two lines 6 and 8 are provided with respective constrictions 7 and 10, which are advantageously formed by adjustable throttle valves, and merge at 13 into a common conduit 14 leading to the orifices 4d. Upstream of constriction 10 the overflow line 8 is provided with an extension 11 through which excess oil is returned by way of bearings 18 (representative of any additional equipment to be lubricated and/or cooled) to the sump 16. A similar return line, not shown, leads to a sump from the clutch 4.

In accordance with our present invention, a control inlet 9a of valve 9 is connected to line 12 at a point 9b between its two junctions 5 and 17. Valve 9 is provided with a preferably adjustable loading spring 9c which biases it toward a cut-off position against the countervailing fluid pressure at control inlet 9a. Thus, with the delivery pressure of pump 1 exceeding the threshold set by spring 9c whenever the engine operates above a certain minimum speed, oil will flow at that threshold pressure in line 12 to working inlet 4e so as to be available for displacing its piston 4c (or its nonillustrated mate) when required. The same fluid pressure prevails in branch 6, upstream of constriction 7, and gives rise to a flow component of reduced but still constant pressure at junction 13.

Another flow component, at a variable pressure corresponding to the difference between the pump pressure and the threshold of valve 9, is present in line 8 and serves to supplement the constant-pressure flow into conduit 14 via junction 13. Some of that flow is deviated via extension 11 to bearings 18 which may be those of the engine, of the vehicular traction wheels and/or of the intervening transmission.

Through suitable adjustment of spring 9c and/or throttles 7, 10 it is possible to insure optimum oil pressure at orifices 4d under all operating conditions, with proper heat dissipation even at maximum speeds of the input and output shafts (not shown) to be coupled or decoupled by the clutch 4.

We claim:

1. A fluid-supply system for a hydraulically actuated coupling controlling the transmission of torque from an engine to a load, said coupling being provided with a first inlet for a working fluid and with a second inlet for an ancillary fluid, comprising:
   - an engine-driven pump for the circulation of a hydraulic liquid;
   - a supply line extending from said pump to said first inlet;
   - pressure-regulating means connected to said supply line for maintaining therein a fluid pressure substantially independent of engine speed with the engine operating above a predetermined speed limit;
   - an overflow line for excess fluid under variable pressure connected to said pressure-regulating means;
   - a branch line connected to said supply line; and
   - a conduit communicating with said overflow line and with said branch line for delivering a mixture of fluid of variable pressure from said overflow line and fluid of substantially constant pressure from said branch line to said second inlet.

2. A fluid-supply system as defined in claim 1 wherein said overflow line and said branch line are provided with respective constrictions upstream of said conduit.

3. A fluid-supply system as defined in claim 2 wherein said overflow line is provided with an extension, upstream of said constriction thereof, for the delivery of excess hydraulic liquid to another load.

4. A fluid-supply system as defined in claim 1 wherein said pressure-regulating means comprises a spring-loaded pressure-relief valve having a control inlet connected to said supply line.

* * * * *